United States Patent
Connor (10) Patent No.: US 9,519,530 B2
(45) Date of Patent: Dec. 13, 2016

(54) DETECTING CONFLICTING OPERATIONS AND PROVIDING RESOLUTION IN A TASKING SYSTEM

(75) Inventor: Jason L. Connor, Fort Collins, CO (US)

(73) Assignee: Red Hat, Inc., Raleigh, NC (US)

( * ) Notice: Subject to any disclaimer, the term of this patent is extended or adjusted under 35 U.S.C. 154(b) by 704 days.

(21) Appl. No.: 13/483,706

(22) Filed: May 30, 2012

(65) Prior Publication Data

US 2013/0326536 A1    Dec. 5, 2013

(51) Int. Cl.
| | | |
|---|---|---|
| G06F 9/46 | (2006.01) | |
| G06F 13/00 | (2006.01) | |
| G06F 11/07 | (2006.01) | |
| G06F 9/48 | (2006.01) | |

(52) U.S. Cl.
CPC ....... *G06F 11/0715* (2013.01); *G06F 11/0766* (2013.01); *G06F 9/4881* (2013.01); *G06F 2209/484* (2013.01); *G06F 2209/485* (2013.01)

(58) Field of Classification Search
None
See application file for complete search history.

(56) References Cited

U.S. PATENT DOCUMENTS

| | | | |
|---|---|---|---|
| 8,505,009 B2 * | 8/2013 | Devadoss | G06F 9/526 711/163 |
| 2009/0133026 A1 * | 5/2009 | Aggarwal et al. | 718/103 |
| 2012/0227051 A1 * | 9/2012 | Craik et al. | 718/104 |

FOREIGN PATENT DOCUMENTS

WO    WO 02/46914 A2 *    6/2002   ............... G06F 9/00

OTHER PUBLICATIONS

"Celery-Distributed Task Queue", Celery 4.0.0rc2 documentation, ask.github.io/celery/, 2 pages.
"Rewriting Huey for Beter API", charlesleifer.com/blog/idea-for-simple-task-queue/, May 15, 2013, 3 pages.

* cited by examiner

*Primary Examiner* — Bing Zhao
(74) *Attorney, Agent, or Firm* — Lowenstein Sandler LLP (57) ABSTRACT

A mechanism for detecting conflicting operations and providing resolutions in a tasking system is disclosed. A method includes receiving, by a processing device in a tasking system, a request for a call including at least one operation to be executed on at least one resource of a plurality of resources that are managed by the tasking system. The method also includes detecting an occurrence of a conflict between the at least one operation on the call request and queued operations associated with the plurality of resources. The method also includes generating at least one of a task or an error report for the at least one operation in the call request based on the conflict. The method further includes identifying task dependencies associated with the at least one task and executing the at least one task only after execution of the task dependencies.

17 Claims, 5 Drawing Sheets

| Resource ID — 302 | Operation(s) — 304 |
|---|---|
| cds – RESOURCE_CDS_TYPE | create – RESOURCE_CREATE_OPERATION<br>read – RESOURCE_CREATE_OPERATION<br>update – RESOURCE_CREATE_OPERATION<br>delete – RESOURCE_CREATE_OPERATION |
| consumer – RESOURCE_CONSUMER_TYPE | |
| content unit - RESOURCE_CONTENT_UNIT_TYPE | |
| respository - RESOURCE_REPOSITORY_TYPE | |
| respository Distributor - RESOURCE_REPOSITORY_DISTRIBUTOR_TYPE | |
| respository importer - RESOURCE_REPOSITORY_IMPORTER_TYPE | |
| role - RESOURCE_ROLE_TYPE | |
| user - RESOURCE_USER_TYPE | |

DETECTING CONFLICTING OPERATIONS AND PROVIDING RESOLUTION IN A TASKING SYSTEM

TECHNICAL FIELD

The embodiments of the invention relate generally to a computer system and, more specifically, relate to mechanism for detecting conflicting operations and providing resolution in a tasking system environment.

BACKGROUND

Tasking systems are well-known technology used in software engineering and software quality assurance. Tasking systems implement a software development practice of frequently managing a number of resources, such as repositories, consumers, content, and so on. The managing of the resources includes performing tasks on the resources. Such tasks include, but are not limited, to creating operations, deleting operations, reading operations, and updating operations on the resources.

There are various tasking systems that exist today. One such system is Celery™, which is an open source task queue system based on distributed message passing on real-time operations. The Celery™ includes execution units, called tasks, which are executed concurrently on one or more worker nodes using multiprocessing. Tasks can execute asynchronously (in the background) or synchronously (wait until ready).

Another known tasking system is Cue™ is a multi-threaded task system that functions to perform expensive and time-consuming operations by decoupling the creation of a request of an action from its execution. In Cue™, by utilizing a simple message format, a command is queued (placed on the task queue) and forgotten by a client, and then is later dequeued (removed from the task queue) and executed.

However, the above tasking system, as well as many other tasking systems, faces the problem of managing multiple resources under concurrent operations.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide a mechanism for detecting conflicting operations and providing resolution in a tasking system.

According to one embodiment of the invention, the method includes receiving, by a processing device in a tasking system, a request for a call. The request for the call includes at least one operation to be executed on at least one resource of a plurality of resources that are managed by the tasking system. The method also includes, detecting, by the processing device, an occurrence of a conflict between the at least one operation on the call request and queued operations associated with the plurality of resources. The queued operations are maintained in a task queue of the tasking system. The method also includes generating, by the processing device, at least one of a task or an error report for the at least one operation in the call request based on the conflict. The method further includes identifying, by the processing device, task dependencies associated with the at least one task and executing, by the processing device, the at least one task only after execution of the task dependencies.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "storing", "detecting", "generating", "executing" "placing", "identifying "rejecting", "matching", "adding", "reporting" "determining", "passing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention disclose systems and methods for detecting conflicting operations and providing resolution in a tasking system. Tasking systems implement a software development practice of frequently managing a number of resources. These resources may include software repositories and their associated content (such as packages, errata, and distributions), consumers, content, and so on. The managing may of these resources may include performing tasks on the resources. A task is a data structure that executes operations on the resources. Tasks may include, but are not limited to, creating operations, deleting operations, reading operations, updating operations, performing operations on the resources. In one embodiment, a coordinator execution module is initialized on an operating system (OS) to detect conflicting operations and provide resolution for the conflicting operations in a tasking system associated with the coordinator execution module.

Figure 1:
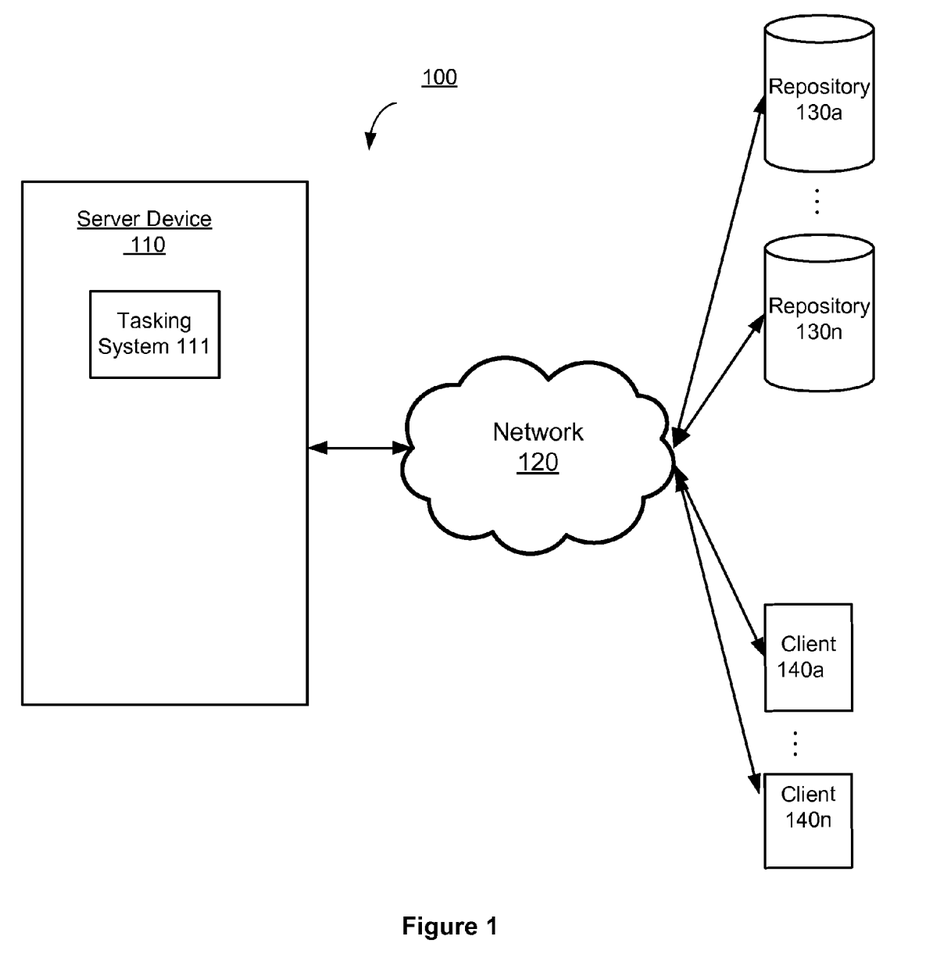
FIG. 1 illustrates an exemplary network architecture in which embodiments of the invention may operate.

FIG. 1 illustrates an exemplary network architecture 100 in which embodiments of the present invention may operate. The network architecture 100 may include a server device 110 configured to manage resources including software repositories (a.k.a. repositories) and their associated content, such as packages, errata, and distributions. In one embodiment, the server device 110 detects conflicting operations and provides resolution in a tasking system 111. In one embodiment, the server device 110 is connected to one or more repositories 130a-130n via network 120. The network 120 may be a private network (e.g., a local area network (LAN), wide area network (WAN), intranet, etc.), public network (e.g., the Internet), or a combination thereof. In one embodiment, the server device 110 is connected one or more client devices 140a-140n via the network 120. In one embodiment, the server device 110 may replicate repositories 130a-130n from a variety of supported sources, such as http/https, file system, International Organization for Standardization (ISO), and Red Hat™ Network (RHN), to a local on-site repository (not shown) associated with the server device 110. The server device 110 provides mechanisms for systems, such as the client devices 140a-140n to gain access to the repositories 130a-130n, providing centralized software installation services for the client devices 140a-140n.

In one embodiment, the server device 110 provides tracking of the systems (e.g., client devices 140) that are using which repositories 130a-130n, along with a full system history of installation actions. In some embodiment, the server device 110 uses a fine-grained, roles-based, permission model (RBAC) that provides authentication and authorization for the repositories 130a-130n, including integration with external LDAP. The server device 110 may also define groups for repositories 130a-130n, packages, and systems (e.g. clients 140a-140n) and use those groups for bulk operations. In some embodiments, server device 110 defines and enforces system maintenance windows, and also maintains an inventory of system package profiles, including both current and historical information on any changes.

Figure 2:
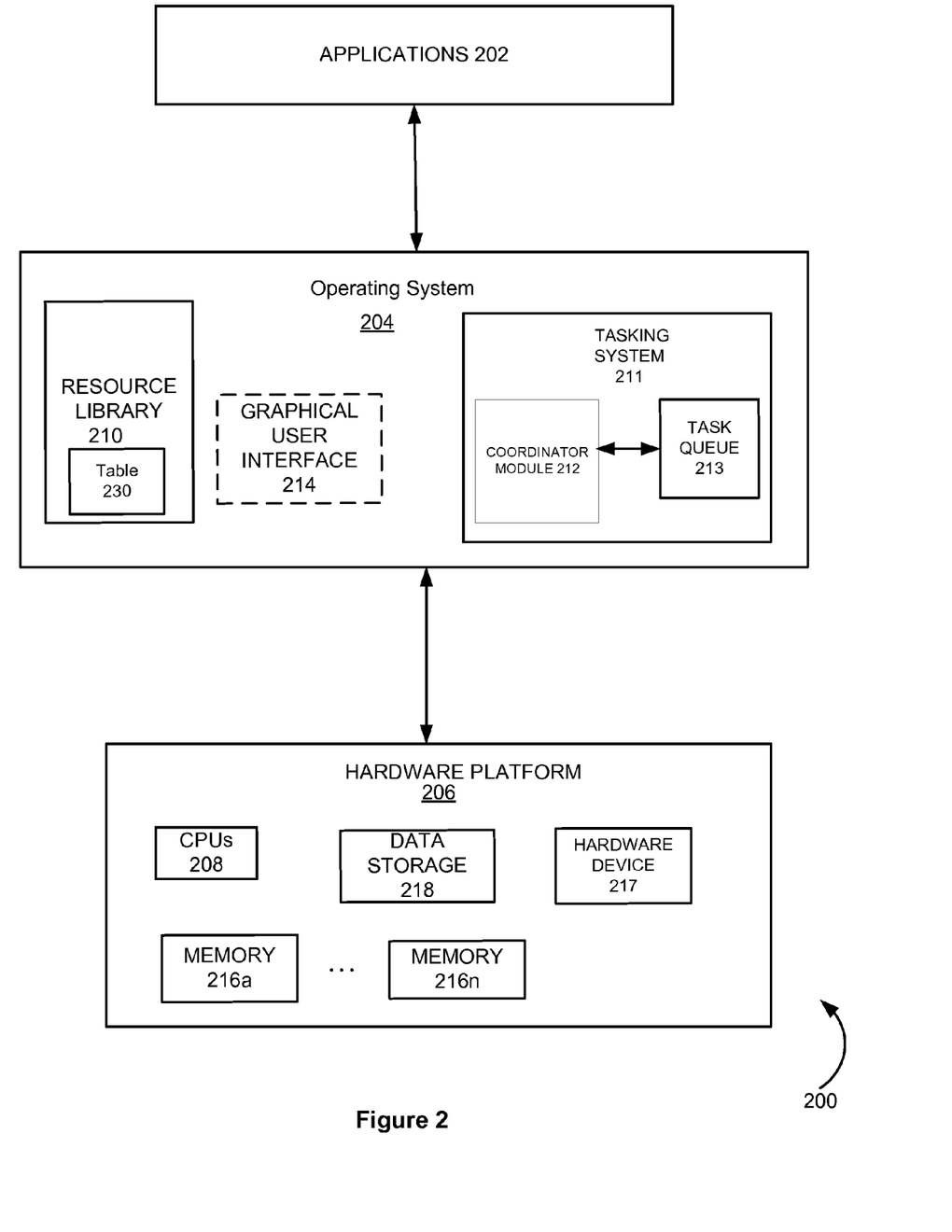
FIG. 2 is a block diagram of a computer system in which the embodiments of the present invention may operate.

FIG. 2 is a block diagram illustrating a computer system 200 in which embodiments of the present invention may be implemented. In one embodiment, the computer system 200 is the same as Server Device 110 described with respect to FIG. 1. In one embodiment, the computer system 200 may be a server device such as, for example, a server computer, a gateway computer or any other suitable computer system that is configurable for operating as a server. The computer system 200 comprises a hardware platform 206, on top of which runs an OS 204 that executes one or more software application programs 202 (i.e., applications 202). The OS 204 may include Microsoft Windows®, Unix®, Linux®, Solaris®, Mac® OS or any other suitable operating system for managing operations on the computer system 200.

The hardware platform 206 may include one or more central processing units (CPUs) 208 and data storage 218. In one embodiment, the data storage 218 comprises one or more hardware and software devices, which may be located internally and externally to the computer system 200. Examples of data storage 218 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.). In addition, hardware platform 206 may include additional hardware devices 217, such as network interface cards (NICs), sound or video adaptors, photo/video cameras, printer devices, keyboards, displays or any other suitable device intended to be coupled to a computer system.

In one embodiment, OS 204 also includes a resource library 110 that functions as a database for storing resource IDs that identify resource types of resources managed by computer system 200 and corresponding operations performed on these resources. In one embodiment, the systems library 216 includes a table 230 to provide the list of resource IDs.

In some embodiments, the OS 204 includes a tasking system 211 that executes tasks on the resources managed by computer system 200. As defined above, a task is a data structure that executes operations on the resources. Tasks include, but are not limited to, performing operations such as creating, reading, updating and deleting the resources. In one embodiment, the operations are executed in parallel on the same resource. In some embodiments, the task system 211 is interfaced by task application programming interfaces (APIs) to access and retrieve the application 202 to execute the operations.

In some embodiments, a task queue 213 is integrated in the task system 211 of the OS 204. In one embodiment, the task queue 213 executes tasks generated in the computer system 200. In one embodiment, the task includes task dependencies. The task dependencies may be blocking tasks that should be executed before executing a task currently under operation. In one embodiment, the task queue 213 functions as a priority queue that tracks the order in which the tasks are en-queued (placed on the task queue 213) and the dependencies of each task in the task queue 213.

In some embodiments, a coordinator execution module 212 is integrated in the task system 211. In one embodiment, the coordinator execution module 212 detects conflicting operations on the resource(s) and provides resolution for these conflicting operations in the tasking system 211. In one embodiment, when a request for a call to execute one or more operations on resource(s) is received by the OS 204, the coordinator execution module 212 matches an ID of the resource associated with the call request with the resource IDs in the resource library 210. Upon any match detections, the coordinator execution module 212 determines if there is a conflict between the one or more operations of the call request with any of queued operations maintained in the task queue 213 of the tasking system 211. In one embodiment, the queued operations are operations that are currently being executed on the matched resource(s). A conflict may occur when the operations on the call request cannot be executed upon receipt. If the coordinator execution module 212 does not detect a conflict, then it generates a task for the operation associated with the call request and places the generated task in the task queue 213 of the tasking system 211 along with the any other dependencies on the task.

On the other hand, if the coordinator execution module 212 detects a conflict, then it performs operations to determine the cause for the conflict. In one embodiment, the coordinator execution module 212 may determine that the conflict is due to the operation of the call request requiring updating or deleting of the resource when an operation is currently being executed on the resource. In this situation, the coordinator execution module 212 may create a task for the operation associated with the call request and place the created task in the task queue 213 along with other task dependencies to be postponed until current operation on the resource is completely executed.

In another embodiment, the coordinator execution module 212 may determine that the conflict is due to the operation of the call request requiring updating of the resource when the resource has already been previously deleted from the on-site repository. In this case, the coordinator execution module 212 may reject the operation associated with the call request and generates an error report.

In some embodiments, the coordination execution module 212 may further execute one or more operations associated with the resources associated with the call request. The OS 204 may also include a graphical user interface 214 to provide a user with an interface to send the call request that includes the one or more operations to be executed on the resources. In some embodiments, the graphical user interface 214 is configured to provide results of the task and an error report to a user.

Figure 3:
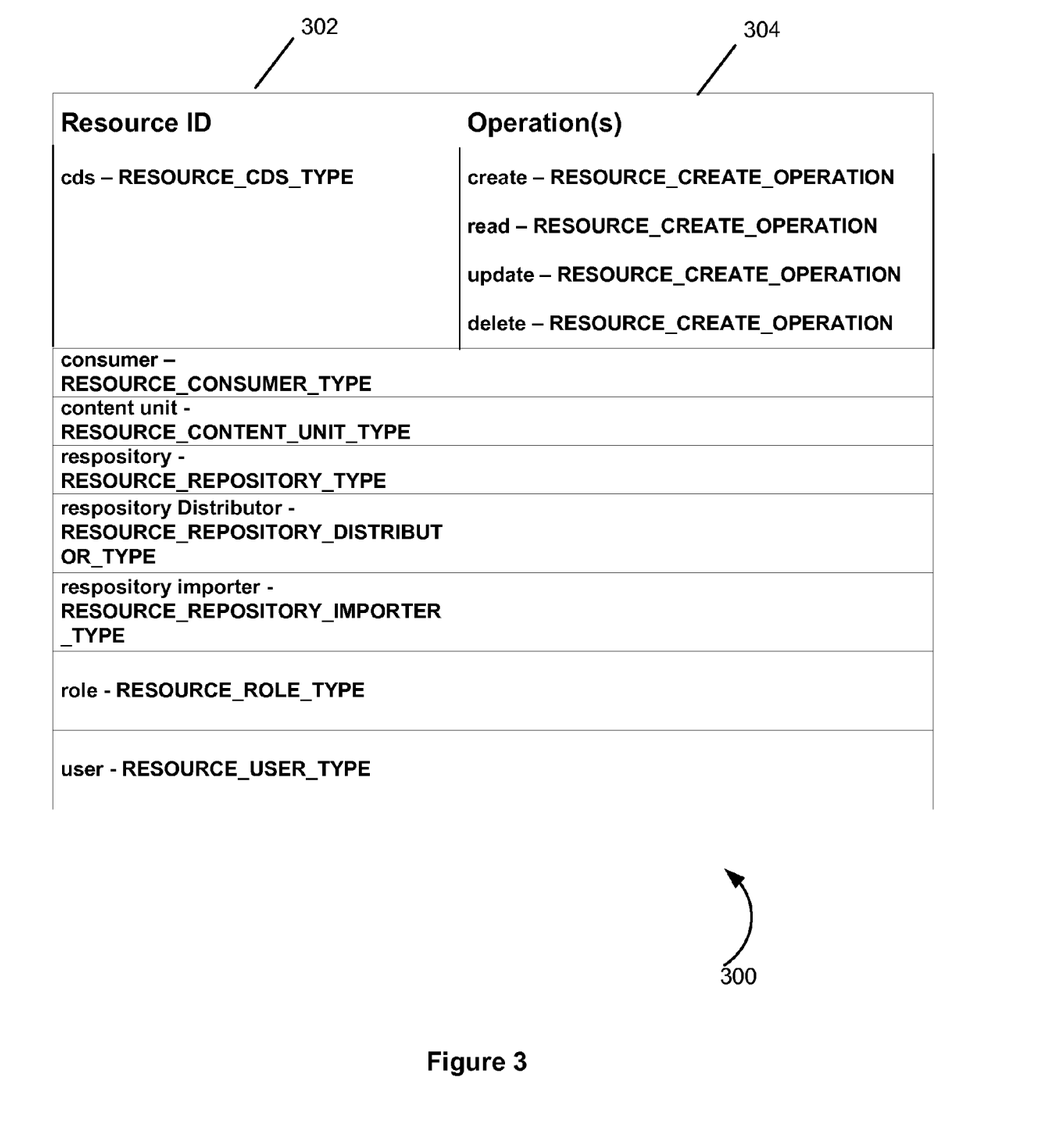
FIG. 3 illustrates an exemplary table of a resource library of a computer system according to an embodiment of the invention.

FIG. 3 illustrates an exemplary table 300 found in the resource 210 of an operating system according to an embodiments of the invention. In one embodiment, table 400 is the same as table 230 depicted as part of resource library 210 in FIG. 2. In one embodiment, table 400 includes columns identifying a Resource ID 302 unique to a resource, and identifying one or more Operations 304 associated with the Resource ID 302.

In one embodiment, the Resource ID 302 identifies the type of resource. Some examples of the Resource IDs 302 may include, but are not limited to, "cds—RESOURCE_CDS_TYPE", "consumer—RESOURCE_CONSUMER_TYPE", "content unit—RESOURCE_CONTENT_UNIT_TYPE", "repository—RESOURCE_REPOSITORY_TYPE", "repository distributor—RESOURCE_REPOSITORY_DISTRIBUTOR_TYPE", "repository importer—RESOURCE_REPOSITORY_IMPORTER_TYPE", "role—RESOURCE_ROLE_TYPE" and "user—RESOURCE_USER_TYPE". In one embodiment, the type of resource identified with the Resource ID 302 refers to a model representing individual resources. Such models include but are not limited to consumers, content units, repositories, roles, users etc.

In some embodiments, the Operation(s) column 304 represents a task performed on the resource associated with the corresponding Resource ID 302. Some examples of such Operations 306 include, but are not limited to, "create-RESOURCE_CREATE_OPERATION", "read-RESOURCE_READ_OPERATION", "update-RESOURCE_UPDATE_OPERATION", "delete-RESOURCE_DELETE_OPERATION".

Figure 4:
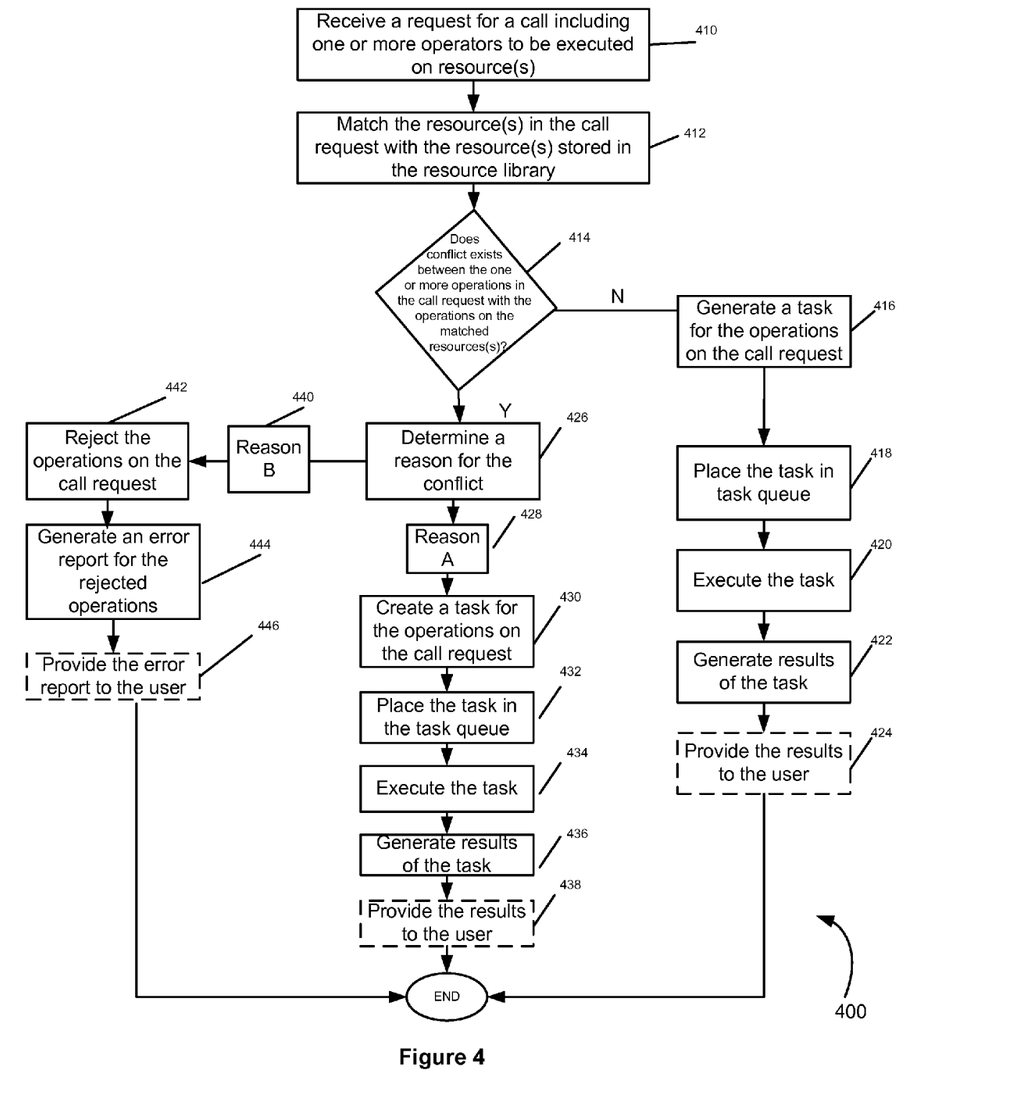
FIG. 4 is a flow diagram of one embodiment of a method for detecting conflicting operations and providing resolution in a task system.

FIG. 4 is a flow diagram illustrating a method 400 for detecting conflicting operation and providing resolution according to an embodiment of the present invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by the coordinator execution module 212 in the task system 211 of FIG. 2.

Method 400 begins at block 410 where a request for a call is received. In one embodiment, the request for a call includes one or more operation(s) to be executed on one or more resource(s). In one embodiment, the operation(s) to be executed include adding the resource(s). In another embodiment, the operation includes reading the resource(s). In a further embodiment, the operation(s) include updating the resource(s). In even further embodiment, the operation(s) include deleting the resources.

At block 412, the resource(s) associated with the call request are searched to identify a match with any resources stored in the resource library 110. In one embodiment, the ID of the resource associated with the call request is matched with the Resource ID(s) 202 of the resource library 110. Upon an occurrence of a match, it is determined, at decision block 414, whether a conflict exists between the one or more operations associated with the call request and the queued operations maintained in the task queue 213 of the tasking system 211. The queued operations include operations currently being executed on the matched resource(s) from the resource library 110. In one embodiment, the operations currently being executed on the matched resource(s) include any operations 204 associated with the resource ID 202 of the matched resource(s). A conflict occurs when the operations on the call request cannot be executed upon receipt.

If no conflicts are identified at decision block 414, then method 400 proceeds to block 416 where a task is generated for the operation in the call request if it is determined that no conflict exists at block 414. At block 418, the task is placed in the task queue 213 of the tasking system 213 along with the any other dependencies on the task. In one embodiment, the task dependencies include additional tasks that need to be executed before executing the task that is generated. At block 420, the task is executed. At block 422, the results of the task after the execution are generated. In one embodiment, the results of the task are provided to the user at block 424.

If at decision block 414, it is determined that a conflict exists, then method 400 proceeds to block 426 to determine a reason for the conflict. In one embodiment, at block 428, it is determined that the conflict is due to Reason A. In one embodiment, the Reason A includes that the operation in the call request relates to updating or deleting of the resource when another operation is currently being executed on the resource. In one embodiment, such an operation may include synchronization of the resource. In that situation, method 400 proceeds to block 430 where a task is created for the operation in the call request. At block 432, the task is placed in the task queue along with any other task dependencies to be postponed until the current operation on the resource is completely executed. At block 434, the task is executed. At block 436, the results of the task after execution are generated. In one embodiment, the results of the task are provided to the user at block 438.

In another embodiment, at block 440, it is determined that the conflict is due to Reason B. In one embodiment Reason B includes that the operation in the call request relates to updating of the resource when the resource has been previously deleted from the database. In this case, method 400 continues to block 442 where the operation on the call request is rejected. At block 444, an error report is generated for the rejection of the operation on the call request. In one embodiment, the error report includes the reasons for rejecting the operation on the call request. In one embodiment, the error report is provided to the user at block 446.

Figure 5:
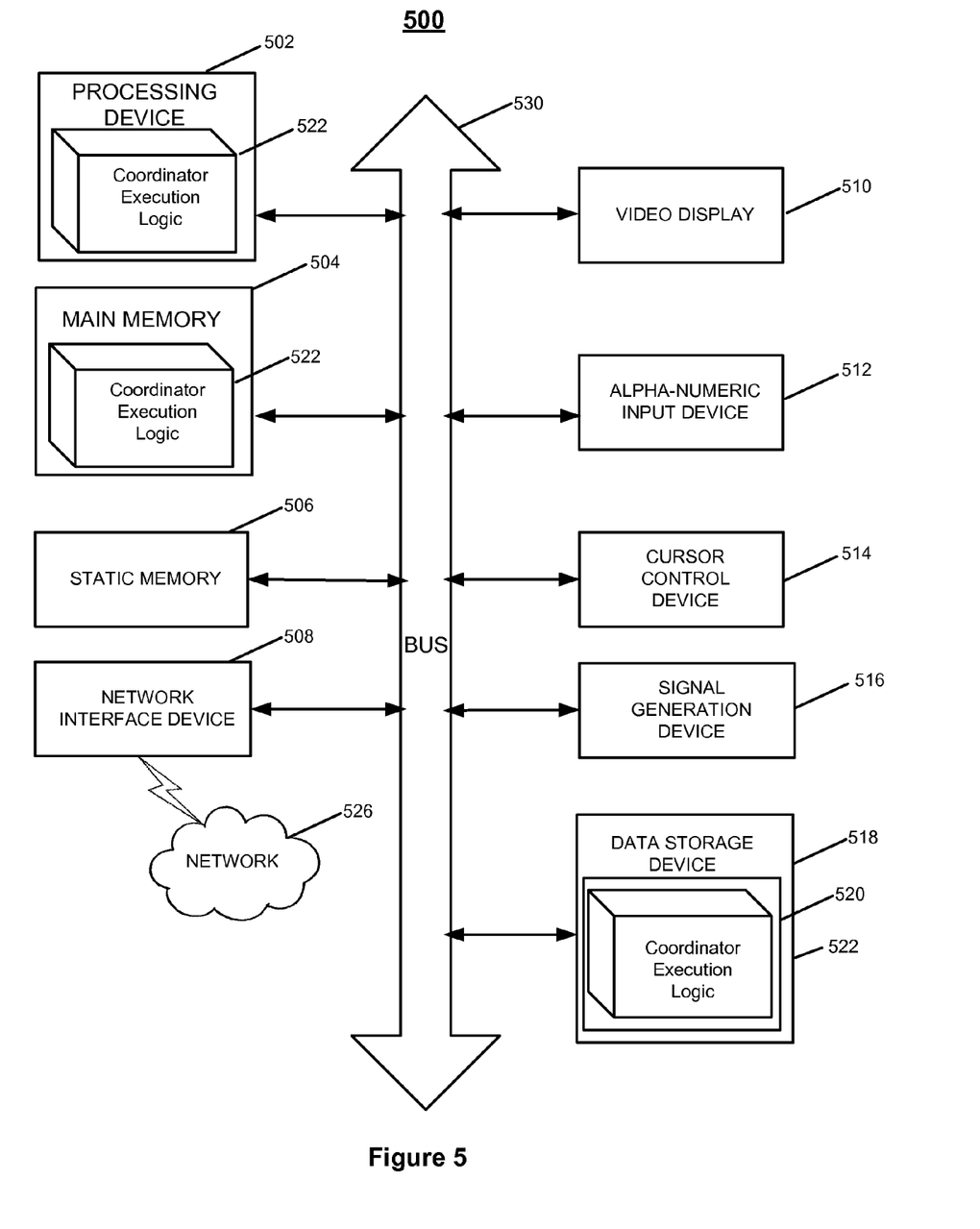
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processing device 502, a memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 430.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute coordinator execution logic 522 for performing the operations and steps discussed herein. In one embodiment, coordinator execution module 112 described with respect to FIG. 2 performs the coordinator execution logic 522.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium (or more specifically a computer-readable storage medium) 520 on which is stored one or more sets of instructions (e.g. coordinator execution logic 522) embodying any one or more of the methodologies of functions described herein, such as methods 500 for providing coordinator execution in a tasking system described with respect to FIG. 4. The coordinator execution module logic 522 may also reside, completely or at least partially, within the memory 504 and/or within the processing device 502 during execution thereof by the computer system 500; the memory 504 and the processing device 502 also constituting machine-accessible storage media.

The machine-readable storage medium 520 may also be used to store the coordinator execution module logic 522 persistently containing methods that call the above applications. While the machine-accessible storage medium 520 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

The invention claimed is:

1. A method, comprising:
receiving, by a processing device, a request for an operation to be executed on a resource among a plurality of resources;
detecting, by the processing device, an occurrence of a conflict between the operation and a queued operation among a plurality of queued operations associated with the resource among the plurality of resources, the plurality of queued operations maintained in a task queue, wherein the detecting comprises matching the resource for the operation with the resource for the queued operation and determining that the queued operation is currently being executed on the resource for the operation, wherein the conflict occurs in response to the operation comprising updating of the matched resource;

generating, by the processing device, a first task for the operation in view of the conflict;

placing, by the processing device, the first task in the task queue for postponement of execution of the first task for the operation;

identifying, by the processing device, a task dependency associated with the first task for the operation, wherein the task dependency comprises a second task to be executed prior to execution of the first task for the operation, wherein the second task is different from the first task; and executing, by the processing device, the first task for the operation after execution of the task dependency.

2. The method of claim 1 further comprising rejecting the request for the execution of the operation and generating an error report of the rejected request.

3. The method of claim 1 further comprising executing the operation upon completion of the execution of the queued operation on the matched resource.

4. The method of claim 1 further comprising in response to determining that the conflict does not exist:
generating the first task for the operation;
storing the first task in the task queue; and
passing the first task to the tasking system for execution of the operation.

5. The method of claim 1, wherein the conflict occurs in response to the operation comprising deleting of the matched resource.

6. The method of claim 1 wherein the conflict occurs in response to the operation comprising updating the resource that has been deleted from a repository.

7. A system comprising:
a memory; and
a processing device, operatively coupled to the memory, to:
receive a request for an operation to be executed on a resource among a plurality of resources;
detect an occurrence of a conflict between the operation and a queued operation among a plurality of queued operations associated with the resource among the plurality of resources, the plurality of queued operations maintained in a task queue, wherein to detect, the processing device is to match the resource for the operation with the resource for the queued operation and to determine that the queued operation is currently being executed on the resource for the operation, wherein the conflict occurs in response to the operation comprising updating of the matched resource;
generate a first task for the operation in view of the conflict;
place the first task in the task queue for postponement of execution of the first task for the operation;
identify a task dependency associated with the first task for the operation, wherein the task dependency comprises a second task to be executed prior to execution of the first task for the operation; and
execute the first task for the operation after execution of the task dependency.

8. The system of claim 7 wherein the processing device to:
reject the request for the execution of the operation and generate an error report of the rejected request.

9. The system of claim 7 wherein the processing device to:
execute the operation upon completion of the execution of the queued operation on the matched resource.

10. The system of claim 8 wherein the processing device to:
reject the request for the execution of the operation and generate an error report of the rejected request.

11. The system of claim 7 wherein the conflict occurs in response to the operation comprising updating the resource that has been deleted from a repository.

12. A non-transitory machine-readable storage medium comprising data that, when accessed by a processing device, cause the processing device:
receive, by the processing device, a request for an operation to be executed on a resource among a plurality of resources;
detect, by the processing device, an occurrence of a conflict between the operation and a queued operation among a plurality of queued operations associated with the resource among the plurality of resources, the plurality of queued operations maintained in a task queue, wherein to detect, the processing device is to match the resource for the operation with the resource for the queued operation and to determine that the queued operation is currently being executed on the resource for the operation, wherein the conflict occurs in response to the operation comprising updating of the matched resource;
generate, by the processing device, a first task for the operation in view of the conflict;
place, by the processing device, the first task in the task queue for postponement of execution of the first task for the operation;
identify, by the processing device, a task dependency associated with the first task for the operation, wherein the task dependency comprises a second task to be executed prior to execution of the first task for the operation; and
execute, by the processing device, the first task for the operation after execution of the task dependency.

13. The non-transitory machine-readable storage medium of claim 12 wherein the processing device is to:
reject the request for the execution of the operation and generating an error report of the rejected request.

14. The non-transitory machine-readable storage medium of claim 12 wherein the processing device is to:
execute the operation upon completion of the execution of the queued operation on the matched resource.

15. The non-transitory machine-readable storage medium of claim 12 wherein the processing device is to:
in response to determining that the conflict does not exist:
generate the first task for the operation;
store the first task in the task queue; and
pass the first task to the tasking system for execution of the operation.

16. The non-transitory machine-readable storage medium of claim 12, wherein the conflict occurs in response to the operation comprising deleting of the matched resource.

17. The non-transitory machine-readable storage medium of claim 12 wherein the conflict occurs in response to the operation comprising updating the resource that has been deleted from a repository.

* * * * *